June 24, 1969 R. G. NURICK 3,451,577
EGG TRAY CONSTRUCTION
Original Filed April 9, 1963 Sheet 1 of 4

INVENTOR.
Raymond G. Nurick
BY
Attorneys

INVENTOR.
Raymond G. Nurick
BY Bialos & Schlemmer
Attorneys

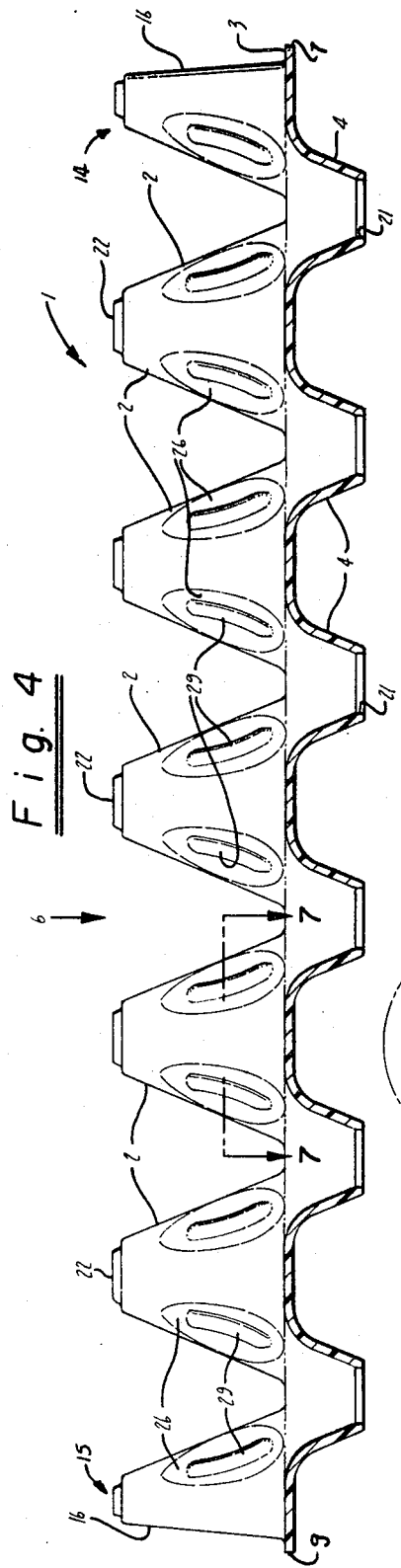
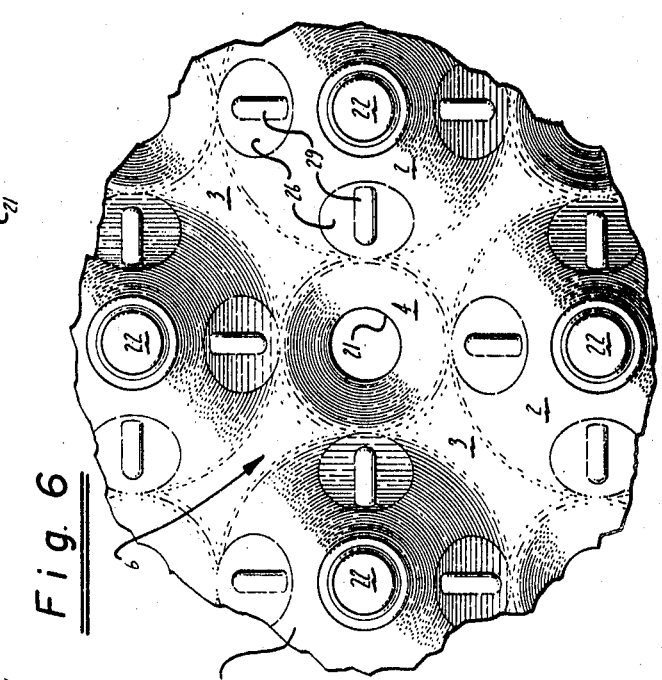
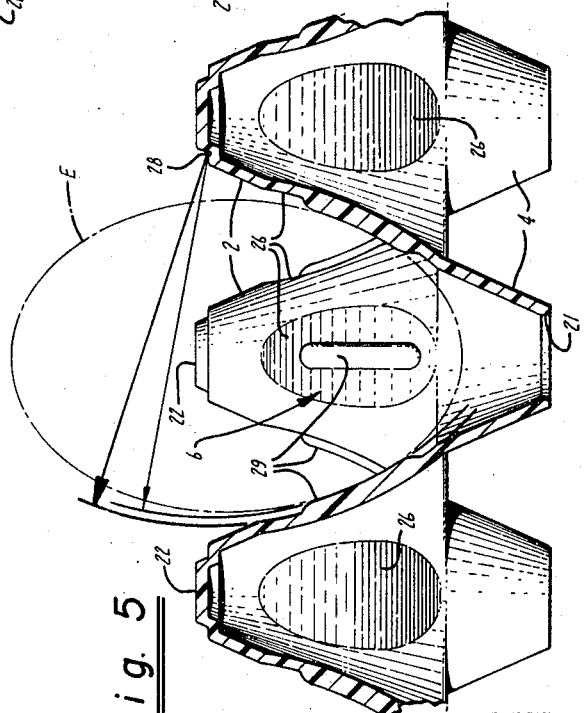

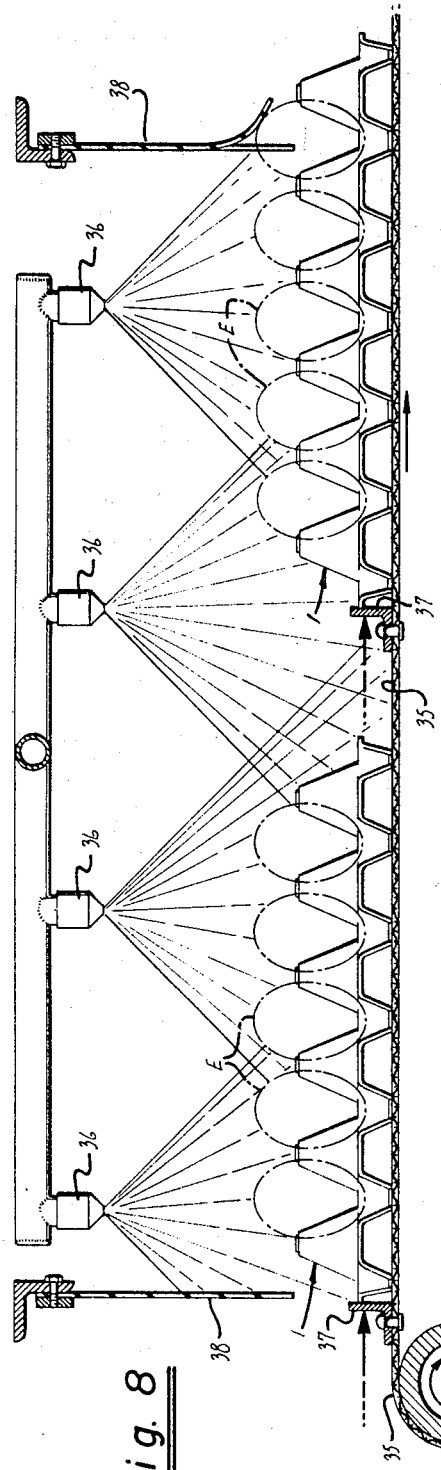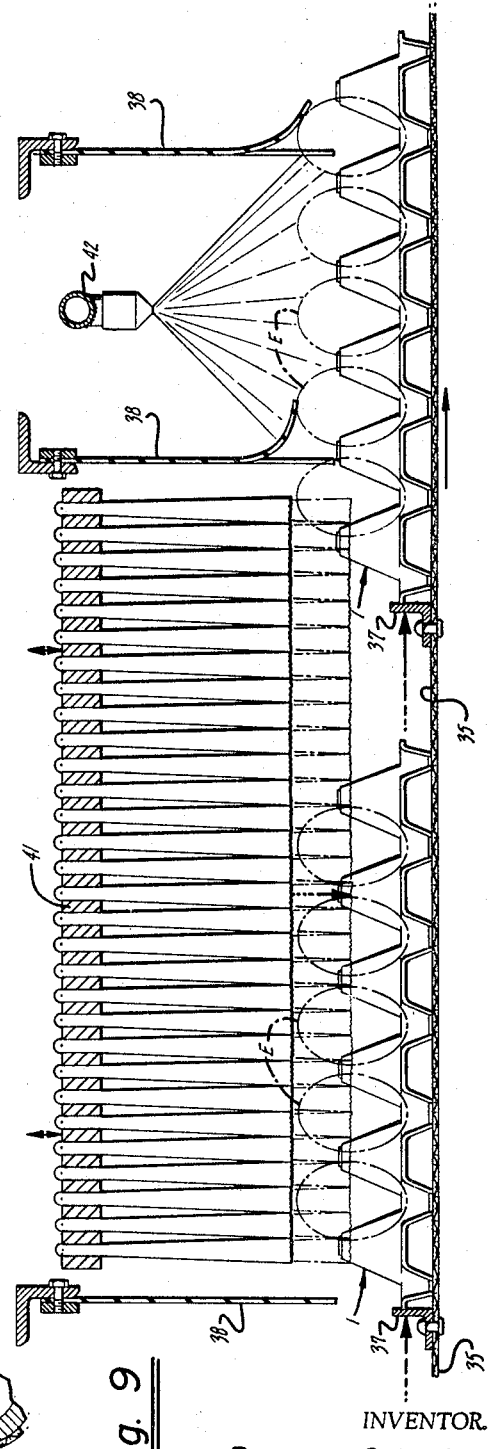

United States Patent Office 3,451,577
Patented June 24, 1969

3,451,577
EGG TRAY CONSTRUCTION
Raymond G. Nurick, Oakland, Calif., assignor to Food Systems, Inc., Berkeley, Calif., a corporation of California
Continuation of application Ser. No. 271,762, Apr. 9, 1963. This application Jan. 16, 1967, Ser. No. 609,687
Int. Cl. B65d 85/32, 81/16
U.S. Cl. 217—26.5   3 Claims

ABSTRACT OF THE DISCLOSURE

An egg washing tray of liquid resistant sheet material, such as plastic, has egg receiving pockets formed by tapered posts which also form a cavity below the plane of the sheet. An imperforate depression in each of four posts facing a pocket has an elongated ridge within the depression which spaces an egg in such pocket from the surface of the depression to allow cleaning liquid to flow around the back of the egg. Each ridge is entirely above the plane of the sheet to accommodate various size eggs; the top of the posts having knobs to allow stacking of trays by engaging in recesses in the bottoms of the cavities.

---

This is a continuation of application Ser. No. 271,762, filed Apr. 9, 1963, and now abandoned.

This invention relates generally to a tray for eggs. More particularly this invention relates to a multi-purpose egg tray into which eggs may be placed during collection at their point of origin, during washing to prepare the eggs for market, and/or during shipping to market. Still more particularly, this invention relates to an egg tray construction which is particularly well suited for holding a plurality of eggs during an egg washing and drying operation, and which is stackable on another similarly constructed egg filled tray in a shipping container for transporting cleansed eggs to market.

To this end, the egg tray construction of this invention is formed from a sturdy yet resilient material which is fluid and heat resistant so that it can resist the effects of heated washing fluids, and yet which is sufficiently resilient to provide an effective cushion for eggs contained therein during handling and shipment. While various materials may be employed for manufacturing the egg tray construction of this invention, preferably a sturdy plastic material of the polyolefin family, such as polyethylene, is employed. Such a plastic egg tray may be molded effectively in one piece from the plastic material in an injection die forming operation of a type well known.

While plastic egg trays have been known generally in the art heretofore, to applicant's knowledge none of the prior known trays employs the particular construction of the subject egg tray in which particular means are provided for supporting each of the eggs in the tray so that thorough washing of the eggs may be effected when the tray is employed in a washing operation, and so that the eggs are effectively supported and resiliently cushioned when the tray is employed in a handling or shipping operation. Furthermore, the subject egg tray is provided with egg receiving pockets constructed to receive eggs of all the varying sizes frequently encountered in the egg industry.

Although, as noted previously, use of the subject tray is not limited to its employment in egg washing operations, the construction of the tray is such that the same may be very effectively employed in egg washing apparatuses of varying types, such as spray washing or brush washing apparatus. The egg tray construction also is such that rapid and thorough drying of the eggs in the tray following washing of the eggs in the tray may be effected. Effective washing and drying is attributable to the novel egg receiving pocket construction to be described which permits thorough circulation of washing fluid and drying air around each egg positioned in the tray.

In this same vein, the subject tray is specifically constructed to take maximum advantage of washing fluid and drying air applied thereto in that all such fluid and air directed through the tray must pass over and around the eggs supported therein in that generally the only fluid passages through the tray are provided in the bottoms of the egg receiving pockets formed therein. This pocket construction insures thorough drainage of washing fluid from the tray and effective egg drying because the eggs are supporting in such a way that blocking or sealing of the pockets by the eggs is precluded.

In line with the preceding summary of this invention, objects thereof include: the provision of a multi-purpose supporting tray for eggs; the provision of an egg tray usable in collecting, washing, and/or shipping a plurality of eggs; the provision of an egg tray which is readily stackable or restable telescopically with quantities of similar egg trays, or stackable non-telescopically on a similar tray filled with eggs and positioned therebeneath during egg shipment or handling; the provision of a fluid and heat resistant egg tray particularly well suited for supporting a plurality of eggs during an egg washing operation; and the provision in an egg tray of means for supporting eggs in preformed pockets, to permit effective washing fluid and drying air flow therearound, and to effectively cushion the eggs during movement. These and other objects of the invention will become apparent from a study of the following disclosure, in which reference is directed to the accompanying drawings.

FIG. 4 is a vertical sectional view through the tray taken in the plane of line 4—4 of FIG. 2.

FIG. 5 is a partial vertical sectional view, on an enlarged scale relative to FIG. 2, taken in the plane of line 5—5 of that figure.

FIG. 6 is a partial plan view, on an enlarged scale relative to FIG. 2, taken in the plane of line 6—6 of FIG. 2 which shows the details of an egg receiving pocket construction.

FIGS. 8 and 9 are generally schematic elevational views of two types of egg washing apparatus in which trays of this type may be employed.

As noted previously, the subject tray may be formed from various materials which possess the requisite heat and fluid resistance, plus the sturdiness and resiliency to make the same effective for use in supporting eggs. In this regard, a sturdy yet relatively light weight polyolefin plastic resin material, of which polyethylene is exemplary, has been found very effective.

Referring first to FIGS. 1 through 7, each egg tray 1 of this invention is defined by a plurality of tapered columns 2 which project upwardly from the top surface of the base sheet 3 of the tray which determines the plane of the sheet. A plurality of tapered posts 4 depend or project downwardly from the bottom surface of the tray base sheet 3. Preferably the base sheet 3 is generally flat and portions thereof lie between the respective columns and posts.

Figure 1:
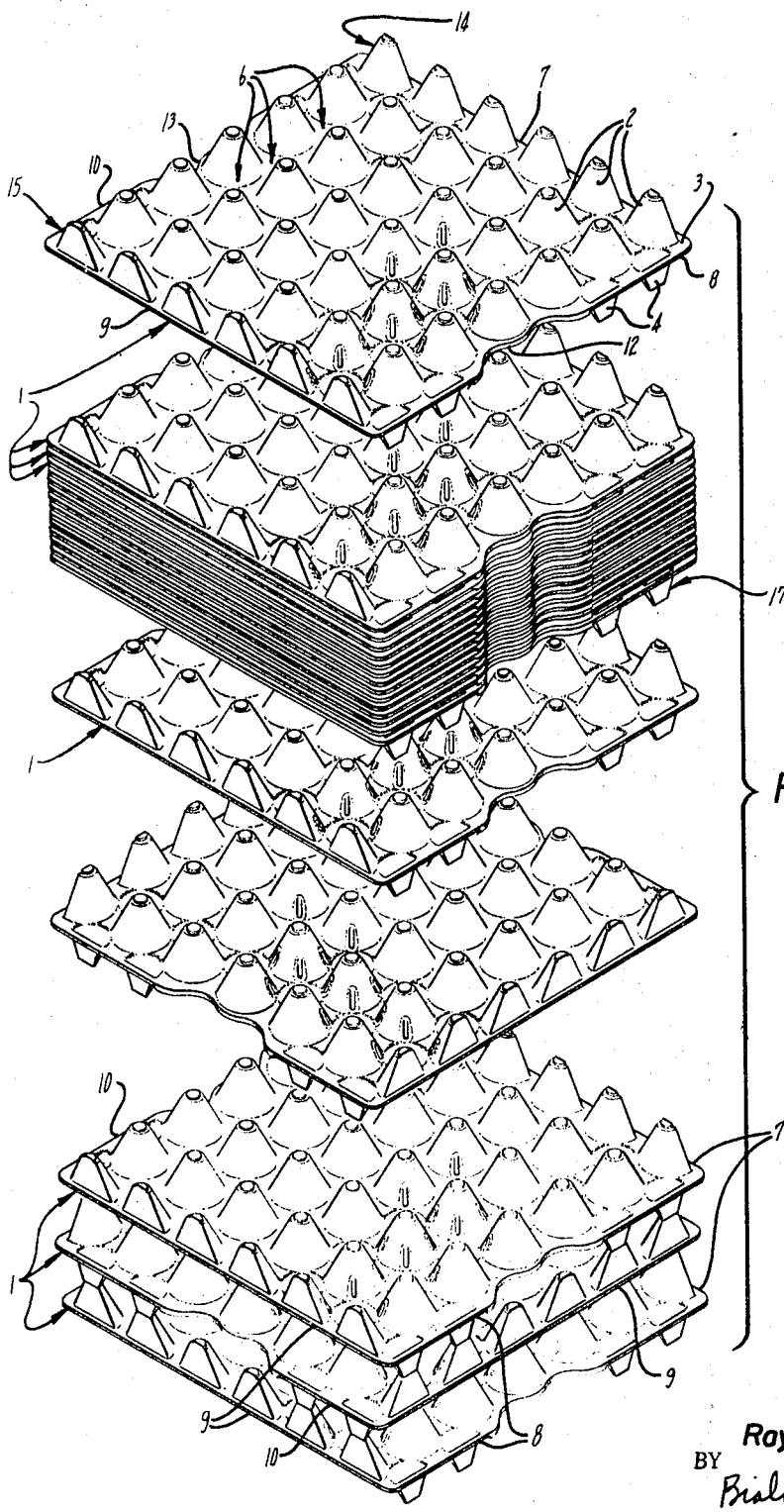
FIG. 1 is an isometric view of a plurality of the subject egg trays illustrating the manner in which a plurality of empty trays may be telescopically nested for shipment or storage, as well as illustrating the manner in which a plurality of egg filled trays may be non-telescopically stacked for handling.
Figure 2:
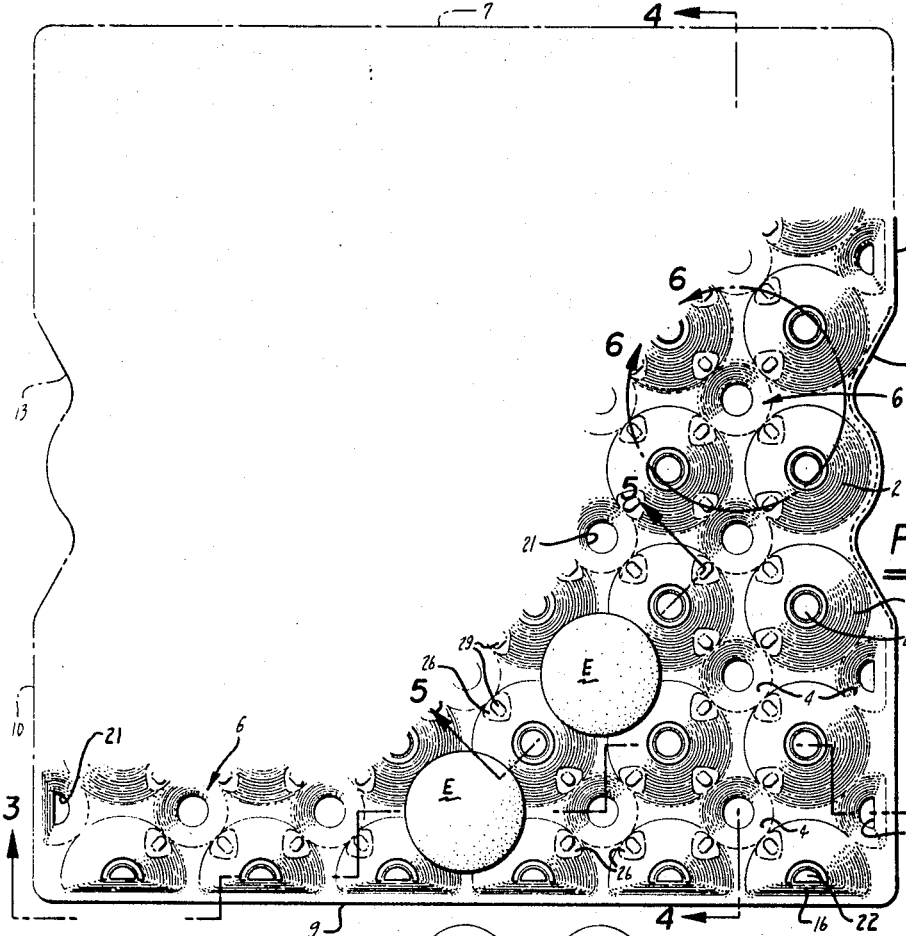
FIG. 2 is a plan view of a tray of the subject construction.

As best seen in FIGS. 1 and 2, the columns 2 extend in parallel rows across the tray. In the embodiment illustrated, the columns are spaced slightly from each other in both directions of the base sheet so that generally planar portions of the base sheet lie between adjacent columns. The depending posts 4 also are arranged in parallel rows across the base sheet with a row of posts being positioned between a row of columns, and vice versa.

Figure 3:
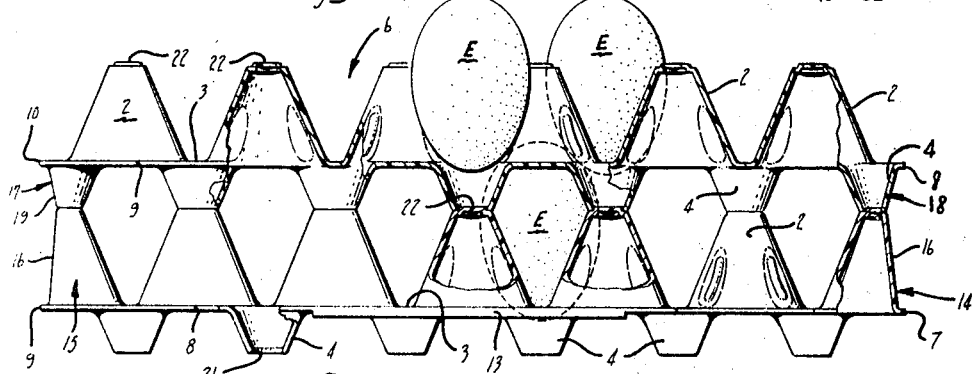
FIG. 3 is a vertical sectional view through the tray taken in the plane of line 3—3 of FIG. 2, which also illustrates the manner in which one tray is stacked on another.

Additionally, as best seen in FIG. 2, the rows of depending posts 4 are staggered or off-set relative to the columns in the adjacent rows of columns. As a result, one depending post is positioned centrally between the columns which make up each group of four columns of the tray, as best seen in FIGS. 2 and 6. Each such group of four columns and the depending post positioned therebetween form an egg receiving compartment or pocket 6 into each of which an egg E is positionable, as seen in FIGS. 2 and 3.

It should be understood that the egg supporting construction of this invention may be incorporated into trays of varying capacities and sizes. In the embodiment illustrated the subject tray is designed to accommodate thirty eggs in the thirty egg receiving pockets 6 provided therein. The outline configuration of the egg tray also may vary depending upon the particular need. Preferably, however, the tray is provided with a generally square outline defined by the generally equal dimensions of its four side edges 7, 8, 9 and 10 as seen in FIG. 2. This square outline is chosen so that a tray filled with eggs may be placed in known generally square cross-sectioned shipping containers of standard size presently employed in the egg industry.

As shown in FIG. 2, the pair of opposite side edges 8 and 10 of the tray are provided with cutout portions 12 and 13 designed to accommodate the fingers of a human hand so that a tray may be inserted into or removed from such a shipping container. These finger receiving cutouts are required because preferably the trays are dimensioned to fit relatively snugly into a shipping container. Thus the cutouts provide the necessary accommodating openings to permit the fingers to be placed between the edges of the tray and the inner wall of a shipping container during insertion or removal of a tray relative to a shipping container.

To provide thirty egg receiving pockets mentioned, the illustrated embodiment has forty-two columns projecting upwardly from the tray base sheet 3 and thirty-eight posts depending downwardly from the base sheet. Four posts are eliminated along side edges 8 and 10 in providing the finger receiving cutouts 12 and 13 mentioned previously.

With the exception of the columns in the two rows of columns 14 and 15 (see FIGS. 1 and 3) which lie most closely adjacent the opposite edges 7 and 9 of the base sheet, all the columns preferably are of upwardly tapering generally conical or frusto-conical construction. Those columns in rows 14 and 15 adjacent side edges 7 and 9, as is clearly shown in FIGS. 1 and 2, are segments of cones, each of which is provided with a generally planar upright face 16 as perhaps best seen in FIG. 4. By thus providing segmented columns adjacent the opposite side edges 7 and 9 of the tray the overall tray dimension may be decreased without decreasing its capacity.

Similarly, and preferably, the majority of the depending posts 4 are of downwardly tapering generally conical or frusto-conical configuration. However, those posts in the two rows of posts 17 and 18 (see FIGS. 1 and 3) adjacent the opposite side edges 8 and 10 of the base sheet are segments of cones each of which has a generally planar outer face 19, as shown in FIGS. 1 and 3.

Each of the posts at its lower end has an opening 21 which extends the full distance across the lower end of each post so that each post is free of all restriction at its lower end. In those ports which are positioned inwardly from the edges of the base sheet, such openings 21 are substantially circular, while in those posts in rows 17 and 18 adjacent the opposite edges 8 and 10 of the base sheet, such openings 21 are generally semi-circular. Note FIG. 2.

While the exact shape of the openings in the lower ends of the posts may vary, depending upon the exact shape of the posts, it should be understood that such openings extend the full distance across the posts so that internal ledges or flanges of the type frequently provided in prior known egg trays are completely eliminated. This is an important feature of this invention in that the lack of all ledges and other restrictions at the lower ends of the posts permits free and unrestricted fluid and air flow and drainage through the posts at the bottom of the pockets when the tray is employed in an egg washing operation.

It should also be noted that openings 21 in the posts are the only openings provided through the egg tray in that the base sheet and the upwardly projecting columns are all imperforate throughout. Thus, for the purpose to be described, the only passages through the tray are provided by the post openings at the bottoms of the egg receiving pockets.

The openings in the post lower ends perform an additional function in that they adapt each tray to be securely interengaged with another tray when filled trays are stacked on each other in a shipping container, or otherwise.

Before describing in detail the particular side wall construction imparted to the columns of this tray, reference is directed to the upper imperforate end of each column which is surmounted at its top with a reduced size projection 22 dimensioned to be received in a cooperable post opening 21 of a similarly constructed tray. As seen in FIG. 2, those projections 22 on the columns spaced inwardly from the opposite edges 7 and 9 of the tray base sheet are generally circular to be received relatively snugly in the generally circular openings 21 in those posts spaced inwardly from the opposite edges 8 and 10 of the tray. However, those projections 22 on the columns in the two rows 14 and 15 adjacent the tray edges 7 and 9 are provided with semi-circular configurations which conform generally with and are snugly receivable in the semi-circular openings 21 provided in the lower ends of the two rows of posts 17 and 18 positioned adjacent the opposite edges 8 and 10 of the tray.

In this regard, referring to FIG. 1, it should be noted that when the trays are similarly oriented as shown in the top of such figure that a plurality of trays may be nested or telescoped one over the other in close fitting fashion to conserve space for shipment and storage. However, when it is desired to stack one tray over another tray filled with eggs, it is merely necessary to rotate or reorient the trays 90° relative to each other, as shown in the lower half of FIG. 1. Such reorientation brings the segmented conical posts of one tray into alignment with the segmented conical columns of an underlying tray so that the trays may be stacked and interlocked. By selectively orienting alternate trays, a stack of trays of any desired height may be built up so that eggs positioned in each of such trays, as seen in FIG. 3, are protected against damage during shipment. Because the reduced projection on the top of each column is snugly received in an associated opening in the bottom of an associated post, lateral shifting of the trays when thus stacked is positively precluded.

Reference is now directed to the wall construction of each column which imparts the novel supporting means for each egg received in the tray which insures thorough washing and drying of each egg when the tray is employed in a washing operation and which effectively cushions each egg when the tray is employed for egg gathering, shipping or other handling.

Each imperforate column 2 is provided with at least one imperforate depression 26 in the tapered side wall thereof. Each such depression extends longitudinally of its associated column so that the depression is of generally elongated outline, which is generally oval in contour as best seen in FIG. 5. As is illustrated in FIGS. 4 and 5 of the drawings, each depression is above the plane of the sheet with its lower end adjacent and in alinement with the plane of the sheet.

Figure 7:
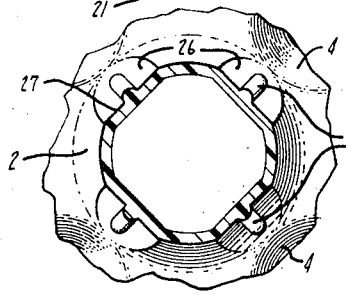
FIG. 7 is a horizontal sectional view taken in the plane of line 7—7 of FIG. 4 illustrating details of construction of an egg supporting column of the tray.

As shown in FIGS. 5 and 7, each depression is curved in only one direction relative to the wall of its associated column. That is, desirably each is curved but only longitudinally along its associated column or, in other words and as shown in FIG. 7, at any horizontal section taken through a given column, each depression is defined by a generally straight line 27. To this end, each depression is defined by a straight edge rotated in a fixed arc about a fixed point 28, as shown schematically in FIG. 5. In the tray embodiment shown, each reference point 28 is located as shown in FIG. 5 atop an adjacent column at the base of its projection 22.

Projecting from each depression is an egg supporting rib 29 which projects from its associated depression to a location closely adjacent to or slightly beyond the outer surface of each column side wall. As seen in FIG. 5, each rib is elongated and narrow configuration and extends longitudinally of its associated column. The ribs follow the curved contour of the depressions, as also shown in FIG. 5.

Referring to FIG. 6, it is seen that in each group of four columns which define an egg receiving pocket 6 that four depressions 26 and ribs 29 are provided, all of which are oriented to face inwardly or toward the associated post 4 depending therebetween. Because of this construction, each egg positioned in each pocket of the tray is engageable only with the ribs 29 in each pocket, as shown in phantom outline in FIG. 5. Thus, each egg, depending upon its size, has only limited point or line contact with the ribs of the four columns which define each pocket. As a result, a clearance space for washing fluid and drying air exists between each egg in the tray and each column of each pocket.

When the tray of this invention is filled with eggs and employed in a washing operation, washing fluid and drying air directed onto the eggs may flow substantially and unrestrictedly around all portions of the eggs held spaced from the columns by the ribs to insure thorough washing and drying of the eggs. Furthermore, the ribs enhance washing and drying by creating turbulence in the washing fluid and drying air passing around the eggs.

In this connection, and again referring to FIGS. 5 and 6, it should be noted, because the only openings through the trays are provided in the depending posts which define the bottom of each egg receiving pocket, that all fluid applied to the eggs during the washing operation must pass around the eggs for drainage through the openings 21 in the bottom of each pocket. This further insures thorough washing, and additionally effects conservation and maximum usage of washing fluid in that the trays are otherwise imperforate.

Furthermore, if washing fluid is employed in sufficient quantities so that the openings 21 in the posts cannot accommodate in free flow fashion the washing fluid quantity employed, a build-up of washing fluid in each pocket is effected to further enhance the proper washing of the lower portions of the eggs.

The depressions further provide an important feature of this tray in that they allow eggs of all sizes to be seated lower in their accommodating pockets than is generally true of prior art trays. That is, when eggs are properly positioned with their small ends down in the egg receiving pockets, the depressions in the column side walls permit the eggs to be inserted further into the tray relative to the top of the columns than would be true if non-depressed column walls were employed.

However, the ribs 29 insure that the eggs are spaced from the base sheet adjacent the bottom of each pocket so that fluid and air flow through the pockets is not sealed off. Note FIG. 5.

Additionally, because the egg supporting ribs 29 are elongated and extend longitudinally of the columns, the tray is adapted to accommodate eggs of varying sizes, from the smaller grades marketed commercially to the so-called jumbo sizes, without in any way producing interference between filled trays stacked one on the other.

It has also been found that the depressions provided in the column side walls enhance the natural resiliency of the plastic material chosen, to thereby further enhance the cushioning affect of the tray on the eggs therein during handling thereof.

Thus, during washing of eggs positioned in a tray of this construction, washing fluid and drying air may flow substantially unimpeded over and around the entire egg surface for effecting a highly efficient washing and drying operation. In this regard, because the lower end of each post is fully open and unrestricted, no washing fluid may accumulate thereat to unnecessarily prolong the drying operation. Nor may dislodged dirt particles become trapped in the posts.

As mentioned previously, each column of the tray is provided with at least one depression and rib construction. However, as seen in FIG. 2 the four columns located most closely adjacent the four corners of the tray are provided with only one depression and rib, in that such columns have only one egg receiving pocket associated therewith.

The conical columns and segmented conical columns which lie intermediate the corner columns adjacent the four edges of the tray are each provided with two spaced depressions and ribs in their side wall because each such column has associated therewith two egg receiving pockets. All other columns of the tray which lie interiorly of the tray edges are provided with four equally spaced depressions and ribs in that all such other columns have four egg receiving pockets associated therewith.

While the exact configuration and dimensions of the depressions and rib employed on the columns may vary in accordance with the size of their associated columns, preferably the depressions and ribs extend over the major length of the associated columns with the ribs being of less length than the associated depressions. This results in eggs being received in the pockets so that the great majority, if not all, of each egg is supported above the upper surface of the tray base sheet.

By way of illustration, the dimensions of one specific egg tray construction found highly effective for the purposes disclosed herein will be described. Such a tray is of square shape and measures 11.563" on a side. The overall height from the top of the projections 22 on the columns to the lower end of the posts is 1.938". Each column projects 1.25" above the top surface of the base sheet and is surmounted by a projection of .063".

Each post depends a distance of .625" from the top surface of the base sheet, with the exact thickness of the base sheet varying to meet particular requirements. The projections on the columns have a diameter of .438" to be received in the opening in the posts which have substantially the same diameter for a snug fit.

The columns are spaced 1.844" between centers, with the posts being similarly spaced. Each row of posts is offset .922" relative to an adjacent row of columns.

The depressions commence at a location .375" downwardly from the top of the column projection and extend to a point 1.313" downwardly therefrom. The rib in each depression commences at a point .281" downwardly from the top extremity of the depression and extends to a point .109" upwardly from the lower extremity of the depression. The maximum width of the rib is .125" and the rib preferably is arcuate in horizontal cross section.

The tapered side walls of the columns and posts extend at an angle of approximately 23½° relative to a plane normal to the plane of the tray base sheet.

Reference is now directed to FIGS. 8 and 9 which illustrate generally schematically two types of apparatus with which the subject tray may be employed in an egg washing operation.

FIG. 8 illustrates a spray type washing apparatus in which a succession of trays 1 filled with eggs E are carried on a perforated conveyor belt 35 moved in any known fashion beneath a bank of spaced spray nozzles 36 which apply a bath of washing fluid over and around each egg in the tray. Preferably a series of spaced pusher elements are riveted or otherwise secured to the conveyor belt 35 to insure movement of the trays through the washing equipment illustrated. In this regard, while the pusher elements on the belt shown are positioned so that the trays are spaced slightly from each other, it should be understood that, to conserve washing fluid, the pusher elements may be positioned so that the trays are in substantial contact with each other.

As described previously upon subjection of the eggs in the subject trays to a washing spray as shown in FIG. 8, because the eggs are spaced from the walls of their associated supporting columns in each pocket, washing fluid may pass freely around the eggs for thorough washing and thence through the openings in the bottoms of the pockets, carrying therewith all foreign matter washed from the eggs.

The belt 35 preferably is finely perforated or formed from metal wire mesh so that it does not impede fluid flow through the trays.

Although not shown in FIG. 8, in a commercial operation a blower would be employed in the apparatus for directing a quantity of drying air over the eggs and the trays upon movement of the tray from the washing chamber. Flexible rubber or like splash guards 38 are provided at opposite ends of the washing chamber to preclude washing fluid waste in a manner well known in the egg processing industry.

Referring now to FIG. 9 a brush or scrubbing type washing apparatus is schematically illustrated in which a vertically reciprocable elongated scrubbing brush construction 41 is mounted above the conveyor belt 35 on which are positioned a series of egg filled trays as described previously with respect to FIG. 8. Washing fluid is applied to the eggs in such an apparatus either separately or by the brush structure 41 so that, upon vertical reciprocation of the brush structure at high speeds by a suitable mechanism (not shown) the brush structure is repeatedly brought into contact with the eggs in the presence of fluid to remove foreign matter therefrom. In this regard, preferably the bristle tufts of the brush structure are contoured to conform to the shape of the eggs for most effective egg scrubbing.

Following passage of the scrubbed eggs in their trays from the washing chamber, the trays preferably are carried beneath a spray rinse nozzle 42 which applies, by spraying, a rinse fluid to the eggs and trays to carry away any loosened foreign matter clinging to the eggs or trays which carry the same. Following rinsing, the eggs and trays preferably are air dried as mentioned above.

In the use of the subject trays in washing eggs with apparatus of the type shown in FIGS. 8 and 9, or in other types of washing apparatus, the important feature stressed previously, namely that washing fluid and drying air may circulate freely around and over the individual eggs in each pocket in the tray is insured so that the washing operation is thoroughly effected.

I claim:

1. An egg supporting and washing tray comprising a sheet of stiff material: a plurality of cavities formed in said sheet, each of said cavities extending downward below the plane of said sheet; an opening provided in the bottom of each cavity; a plurality of tapered columns, four spaced about each of said cavities, extending upward above the plane of said sheet and downward below said plane of said sheet to define a portion of the wall of the said cavities which are adjacent thereto, each said cavity and the four columns adjacent thereto forming an egg receiving pockets; each of said four columns facing one of said pockets having an imperforate depression in a wall thereof above the plane of the sheet with its lower end adjacent and in alinement with the plane of the sheet; at least two of said columns spaced about each of said cavities terminating at their upper ends in a knob having a transverse area smaller than the area in said openings in the bottom of said cavities and surrounded by a shoulder having a transverse area larger than said openings; and an elongated rib extending longitudinally of each of said columns, located within each depression facing one of said pockets, each rib starting above the plane of said sheet and projecting from the surface of the depression in which it is located, and extending downward along said depression but terminating short of said plane of said sheet and above said cavity.

2. The tray of claim 1 which is of material resistant to washing liquid, said ribs about the respective pockets being adapted to support an egg therebetween in engagement with said ribs and spaced from the surfaces of the depressions in which the ribs are located to enable circulation of cleaning liquid between such egg and the depression surfaces.

3. The tray of claim 2 which is of plastic material, and wherein the top ends of said columns are closed to cause downward flow of cleaning liquid applied to the top of said tray only along the exterior surfaces of said columns.

References Cited

UNITED STATES PATENTS 2,950,726   8/1960   Kuhl et al. _____ 217—26.5
3,207,409   9/1965   Reifers et al. _____ 217—26.5

RAPHAEL H. SCHWARTZ, *Primary Examiner.*

U.S. Cl. X.R.

229—2.5